(12) United States Patent
Yoon et al.

(10) Patent No.: US 7,386,733 B2
(45) Date of Patent: Jun. 10, 2008

(54) ALERT TRANSMISSION APPARATUS AND METHOD FOR POLICY-BASED INTRUSION DETECTION AND RESPONSE

(75) Inventors: Seung Yong Yoon, Daejeon (KR); Gae Il Ahn, Daejeon (KR); Ki Young Kim, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 834 days.

(21) Appl. No.: 10/448,414

(22) Filed: May 30, 2003

(65) Prior Publication Data

US 2004/0088583 A1    May 6, 2004

(30) Foreign Application Priority Data

Oct. 31, 2002    (KR) .................... 10-2002-0066900

(51) Int. Cl.
*G06F 11/00* (2006.01)
*G06F 12/14* (2006.01)
*H04B 17/00* (2006.01)
*H04L 29/06* (2006.01)
*G06F 11/30* (2006.01)

(52) U.S. Cl. ................... 713/189; 713/190; 713/193; 713/194; 726/22; 726/23

(58) Field of Classification Search .............. 726/22, 726/23; 713/189, 190, 193, 194
See application file for complete search history.

(56) References Cited

U.S. PATENT DOCUMENTS

| 5,991,881 | A | 11/1999 | Conklin et al. | |
|---|---|---|---|---|
| 7,007,301 | B2 * | 2/2006 | Crosbie et al. | 726/23 |
| 2003/0126468 | A1 * | 7/2003 | Markham | 713/201 |
| 2003/0233578 | A1 * | 12/2003 | Dutertre | 713/201 |

FOREIGN PATENT DOCUMENTS

| KR | 2000-44382 | 7/2000 |
|---|---|---|
| WO | WO 3088532 A1 * | 10/2003 |

OTHER PUBLICATIONS

Peng Ning, Sushil Jajodia, Xiaoyang Sean Wang, "Abstraction-based intrusion detection in distributed environments", Nov. 2001, ACM Transactions on Information and System Security (TISSEC), vol. 4 Issue 4, pp. 407-452.*
Herzog et al., "Cops usuage for RSVP", Network Working Group, RFC: 2749, Jan. 2000, pp. 1-17.*
Haisong Yang, et al.; "*Distributed Intrusion Detection and Reaction Architecture (DIDRA)*"; Proceedings of WISA 2002; Aug. 2002; pp. 59-68.
Sang-Ki Park, et al.; "A Design Secure Network Framework using PBNM"; Proceedings of APNOMS 2002; Sep. 2002; pp. 523-524.

* cited by examiner

*Primary Examiner*—Emmanuel L Moise
*Assistant Examiner*—Courtney D Fields
(74) *Attorney, Agent, or Firm*—Lowe Hauptman Ham & Berner LLP

(57) ABSTRACT

An alert transmission apparatus for a policy-based intrusion detection and response has a central policy server (CPS) and an intrusion detection and response system (IDRS). In the CPS, a policy management tool generates security policy information and then stores the generated security policy information in a policy repository. A COPS-IDR server sends the information to the IDRS and an IDMEF-XML-type alert transmission message to a high-level module. An IDMEF-XML message parsing and translation module stores a parsed and translated IDMEF-XML-type alert transmission message in an alert DB or provides the message to an alert viewer. In the IDRS, a COPS-IDR client generates the IDMEF-XML-type alert transmission message and provides the message to the CPS. An intrusion detection module detects an intrusion. An intrusion response module responds to the intrusion. An IDMEF-XML message building module generates an IDMEF-XML alert message and provides the message to the COPS-IDR client.

10 Claims, 6 Drawing Sheets ically a network environment 20
ALERT TRANSMISSION APPARATUS AND METHOD FOR POLICY-BASED INTRUSION DETECTION AND RESPONSE

FIELD OF THE INVENTION

The present invention relates to an alert transmission apparatus and method for a policy-based intrusion detection and response; and, more particularly, to the apparatus and method for performing both a policy transmission and an alert transmission for an intrusion detection and response by using a new type protocol, i.e., a common open policy service protocol for an intrusion detection and response (COPS-IDR) and new objects of the COPS-IDR protocol.

BACKGROUND OF THE INVENTION

Conventionally, a network management policy manages and executes security policies by applying an intrusion detection and response concept to a network environment more effectively and integratively.

Conventional protocols for a policy-based intrusion detection and response system are classified into a common open policy service (COPS) protocol for transmitting policy information and an intrusion alert protocol/intrusion detection exchange protocol (IAP/IDXP) for transmitting alert information. In this case, it is required to install the IAP/IDXP additionally at a policy-based system having the COPS protocol in order to transmit alert information appropriately.

FIG. 1 shows a block diagram for illustrating a conventional alert transmission apparatus for a policy-based intrusion detection and response including a central policy server (CPS) 10 and an intrusion detection and response system (IDRS) 20.

Security policy information (hereinafter, policy information) generated at a policy management tool 11 in the CPS 10 is stored at a policy repository (PR) 12 and provided to a COPS server 13 at the same time.

The COPS server 13 provides the policy information to a COPS client 21 in the IDRS 20 through a COPS protocol S1, and then, the COPS client 21 sends the policy information to an intrusion response module 23 and an intrusion detection module 25 to thereby execute the policy information.

If an intrusion occurs by a hacker while the policy information provided from the COPS client 21 is being executed, the intrusion detection module 25 detects the intrusion and generates a raw alert transmission message. Then, the raw alert transmission message is provided to an IDMEF-XML (intrusion detection message exchange format extensible markup language) message building module 27 and the intrusion response module 23. When the raw alert transmission message is transmitted from the intrusion detection module 25 to the intrusion response module 23, the intrusion response module 23 copes with the intrusion.

The IDMEF-XML message building module 27 transforms the raw alert transmission message into an IDMEF-XML-type alert transmission message and provides the IDMEF-XML-type alert transmission message to an IAP/IDXP analyzer 29.

The IAP/IDXP analyzer 29 provides the IDMEF-XML-type alert transmission message to an IAP/IDXP manager 14 in the CPS 10 through an IAP/IDXP protocol S2.

The IAP/IDXP manager 14 sends the IDMEF-XML-type alert transmission message to an IDMEF-XML message parsing and translation module 15. The IDMEF-XML message parsing and translation module 15 parses and translates the IDMEF-XML-type alert transmission message, so that the message is stored at an alert database (DB) 16 or provided to an alert viewer 17.

In order to transmit alert information between the CPS 10 and the IDRS 20, both the COPS protocol S1 for transmitting the policy information and the IAP/IDXP S2 for transmitting the IDMEF-XML-type alert transmission message are required. As a result, a complexity of structures between the CPS 10 and the IDRS 20 is increased. Further, when a plurality of clients (e.g., a plurality of IDRSs 20) are connected to a single server (e.g., the CPS 10), there is a problem of managing both the alert information and the policy information inconsistently.

Alert transmission technologies for the policy-based intrusion detection and response are described in "Method for Transmitting Alert Information in Transmission System," filed as a Korean application No. 10-1998-0060879 on Dec. 30, 1998, "Distributed Intrusion Detection and Reaction Architecture," disclosed in Proceedings of WISA 2002 dated August 2002, and "A Design of Secure Network Framework using PBNM," disclosed in Proceedings of APNOMS2002 dated September 2002.

According to the Korean application No. 1998-0060879, in a method for transmitting alert information, the alert information generated in the transmission system is sent to an operator of a central center such as a network management system. The method is performed by following steps. When the alert information is received, a timer is set. The received alert information is continuously stored in a buffer. When a timeout signal is received from the timer, the alert information stored in the buffer is read and transformed into an alert packet. Then, the buffer is checked whether it is full of the alert information. If the buffer is full of the alert information, the alert information is transformed into the alert packet.

Thereafter, it is checked whether a channel connected to the central center has been set in the transmission system. If the channel has not been set, the channel should be set. On the other hand, if the channel has been set, the alert packet is outputted to the central center. When the alert packet is entirely transferred, the channel is released.

In this prior art, the alert information generated in the transmission system during a fixed time is grouped into one packet and then sent to the central center, thereby reducing an increase of traffic due to the transmission of the alert information.

Next, according to "Distributed Intrusion Detection and Reaction Architecture", a distributed intrusion detection and response system includes a central analyze center functioning as a policy decision point (PDP) like the policy-based intrusion detection and response system, a distributed analyze center for processing the functions of the central analyze center distributively, a sensor acting as a policy enforcement point (PEP) and security policy enforcement points.

Each of the central analyze center and the distributed analyze center has a central security policy server, a central monitor station, a central analyzer center and a central data warehouse acting as a policy repository.

Herein, as protocols convey information between the PDP and the PEP, an intrusion detection exchange protocol (IDXP) is used for transmitting alert information and a common open policy service (COPS) protocol is used for transmitting policy information, wherein the IDXP is defined as a profile of a blocks extensible exchange protocol (BEEP) corresponding to a general application protocol framework. Both the protocols transmit information by using security characteristics provided by a transport layer security (TLS) profile and a SASL profile suggested by the BEEP. Therefore, the policy information and the alert information can be more safely transmitted.

The prior art describes that the COPS protocol for transmitting the policy information may be applied on the BEEP in two ways. First, the COPS protocol can be directly used on the BEEP without a modification. Second, the COPS protocol is transformed into an XML-type protocol corresponding to a profile of the BEEP and then used. In this case, the alert information has an IDMEF-XML type being standardized in IDWG of Internet engineering task force (IETF).

Next, according to "A Design of Secure Network Framework using PBNM", a cyber patrol control system (CPCS) acting as a central policy server in a wide area network performs a security management and a security gateway system (SGS) includes an intrusion detection system (IDS) for intrusion detection and response.

The CPCS includes a COPS server for transmitting policy information, an IAP server for transmitting alert information, an alert manager for managing the alert information provided from several SGSs, a high-level analyzer for performing a synthetic analysis such as an alert correlation and the like, in a high level, a policy management tool for generating and editing the policy information, a policy decision point for distributing the generated policy information and a web server for providing a user interface.

Meanwhile, the SGS includes a COPS client for transmitting the policy information, an intrusion alert protocol (IAP) client for transmitting the alert information, a CP-agent acting as a local manager in the SGS, a DBM for storing and managing both the policy information and the alert information and a sensor/analyzer for detecting an intrusion.

In this prior art, protocols for conveying information between the CPCS (PDP) and the SGS (PEP) include a COPS protocol and an IAP protocol. The COPS protocol suggested by PBNM is used for transmitting the policy information and the IAP protocol suggested by IDWG of IETF is used for transmitting the alert information. Both the protocols have a client and a server, wherein the server and the client are located in the CPCS and the SGS, respectively.

The alert information transmitted between the CPCS and the SGS has the IDMEF-XML-type being standardized in IDWG of IETF. The IDMEF-XML-type alert information is transmitted through a payload of an IAP protocol message.

The above-mentioned prior arts still have problems. In other words, as shown in FIG. 1, both the COPS protocol S1 for transmitting the policy information and the IAP/IDXP S2 for transmitting the alert information between the CPS 10 and the IDRS 20 are used to convey the alert information, thereby increasing a complexity of structures between the CPS 10 and the IDRS 20. Further, in case where a plurality of clients are connected to a single server, an inconsistent management on information can be one of the problems.

SUMMARY OF THE INVENTION

It is, therefore, an object of the present invention to provide an alert transmission apparatus and method for a policy-based intrusion detection and response, which adopts a new type protocol, i.e., COPS-IDR.

In accordance with one aspect of the invention, there is provided an alert transmission apparatus for a policy-based intrusion detection and response, including a central policy server (CPS) and an intrusion detection and response system (IDRS), wherein the CPS includes: a policy management tool for generating security policy information and storing the generated security policy information in a policy repository; a COPS-IDR server for sending the security policy information provided from the policy management tool to the IDRS through a COPS-IDR protocol and providing an IDMEF-XML-type alert transmission message having an IDMEF-XML-type alert message provided from the IDRS to a high-level module; and an IDMEF-XML message parsing and translation module for parsing and translating the IDMEF-XML-type alert transmission message provided from the COPS-IDR server, and then storing the IDMEF-XML-type alert transmission message passed and translated at an alert DB or providing the IDMEF-XML-type alert transmission message parsed and translated to an alert viewer corresponding to the high-level module, and wherein the IDRS includes: a COPS-IDR client for receiving the security policy information from the COPS-IDR server through the COPS-IDR protocol and providing the IDMEF-XML-type alert transmission message to the CPS through the COPS-IDR protocol, with the IDMEF-XML-type alert message being encapsulated into an alert object to generate the IDMEF-XML-type alert transmission message; an intrusion detection module for detecting an intrusion in case a hacker intrudes while the security policy information provided from the COPS-IDR client is being executed and generating a raw alert transmission message; an intrusion response module for responding to the intrusion in case the raw alert transmission message is transmitted thereto from the intrusion response module; and an IDMEF-XML message building module for generating the IDMEF-XML-type alert message by formatting the raw alert transmission message and providing the generated IDMEF-XML-type alert message to the COPS-IDR client.

In accordance with another aspect of the invention, there is provided an alert transmission method for a policy-based intrusion detection and response of a system having a CPS and an IDRS, including the steps of: (a) generating security policy information in a policy management tool in the CPS, and then storing the generated security policy information at a policy repository and providing the generated security information to a COPS-IDR server in the CPS at the same time; (b) providing the security policy information, which is supplied from the COPS-IDR server, to a COPS-IDR client in the IDRS through a COPS-IDR protocol; (c) providing the security policy information provided from the COPS-IDR client through the COPS-IDR protocol to an intrusion response module and an intrusion detection module in the IDRS; (d) detecting an intrusion by the intrusion detection module, in case the intrusion occurs by a hacker while the security policy information is being executed, and then generating a raw alert transmission message at the intrusion detection module and providing the generated raw alert transmission message to an IDMEF-XML message building module in the IDRS; (e) generating an IDMEF-XML-type alert message at the IDMEF-XML message building module by formatting the raw alert transmission message and then providing the IDMEF-XML-type alert message to the COPS-IDR client; (f) generating an IDMEF-XML-type alert transmission message by encapsulating the IDMEF-XML-type alert message into an alert object at the COPS-IDR client and then providing the generated IDMEF-XML-type alert transmission message to the COPS-IDR server through the COPS-IDR protocol; (g) checking whether or not the IDMEF-XML-type alert transmission message transmitted to the COPS-IDR server includes the IDMEF-XML-type alert message and then providing the IDMEF-XML-type alert transmission message, in case the IDMEF-XML-type alert message is included in the IDMEF-XML-type alert transmission message, to an IDMEF-XML message parsing and translation module in the CPS; and (h) parsing and translating the IDMEF-XML-type alert transmission message and then storing the IDMEF-XML-type alert transmission message at an alert DB in the CPS or providing the IDMEF-XML-type alert transmission message to an alert viewer corresponding to a high-level module to thereby output the IDMEF-XML-type alert transmission message.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings.

Figure 1:
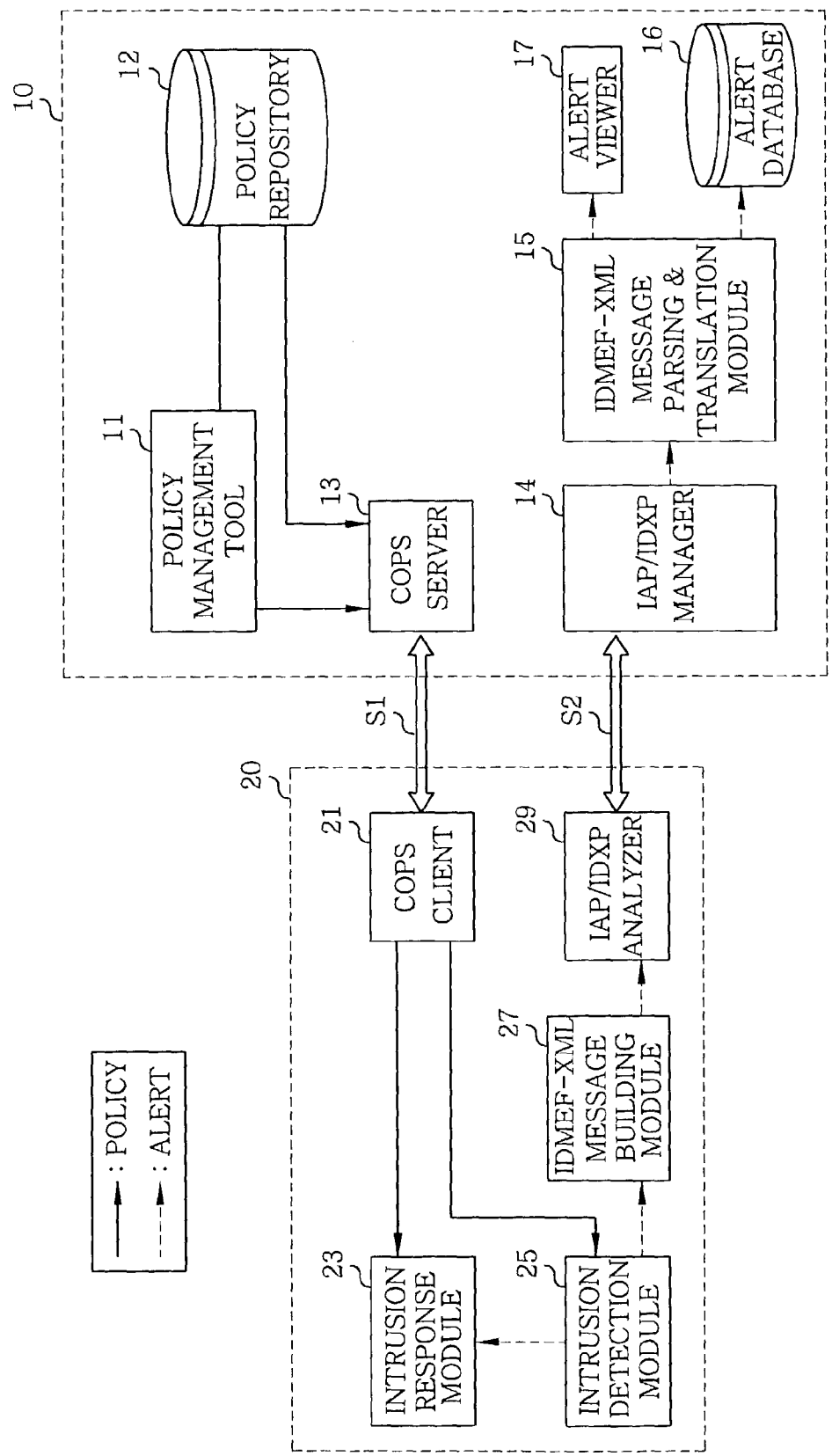
FIG. 1 shows a block diagram for illustrating a conventional alert transmission apparatus for a policy-based intrusion detection and response.
Figure 2:
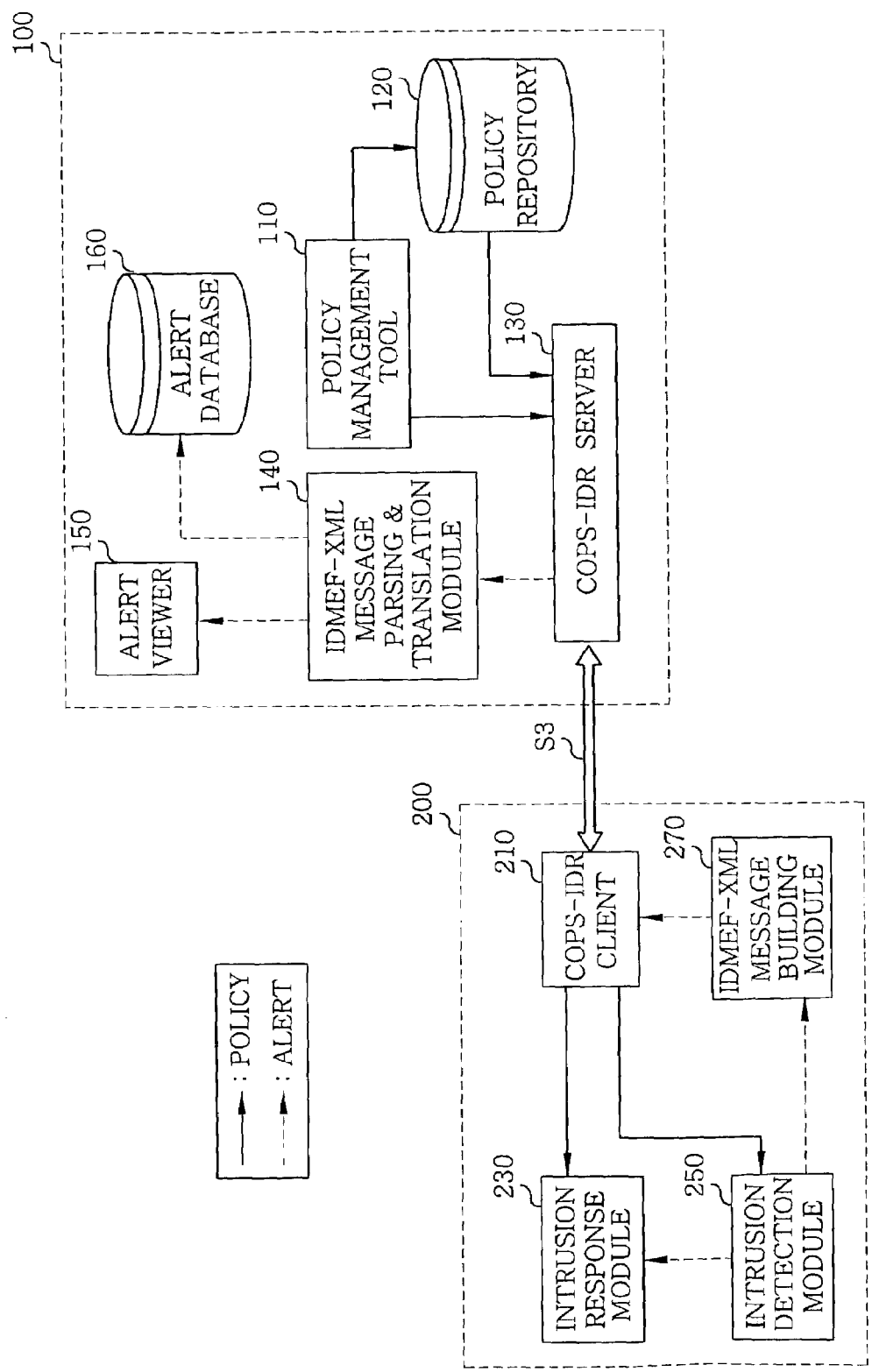
FIG. 2 describes a block diagram for showing an alert transmission apparatus for a policy-based intrusion detection and response in accordance with the present invention.

FIG. 2 shows a block diagram for illustrating an alert transmission apparatus for a policy-based intrusion detection and response in accordance with the present invention, wherein the alert transmission apparatus includes a CPS 100 and an IDRS 200.

The CPS 100 includes a policy management tool 110, a policy repository 120, a COPS-IDR server 130, an IDMEF-XML message parsing and translation module 140, an alert viewer 150 and an alert DB 160.

The policy management tool 110 generates security policy information (or policy information) and then provides the generated information to the policy repository 120 and the COPS-IDR server 130.

The policy repository 120 stores thereat the security policy information.

The COPS-IDR server 130 sends the security policy information provided by the policy management tool 110 to a COPS-IDR client 210 in the IDRS 200 through a COPS-IDR protocol S3.

In this case, the COPS-IDR server 130 checks whether an IDMEF-XML-type alert transmission message provided thereto from the COPS-IDR client 210 through the COPS-IDR protocol S3 contains an alert message. If the alert message is included in the IDMEF-XML-type alert transmission message, the COPS-IDR server 130 provides the IDMEF-XML-type alert transmission message to the IDMEF-XML message parsing and translation module 140.

The IDMEF-XML message parsing and translation module 140 parses and translates the IDMEF-XML-type alert transmission message. Then, the IDMEF-XML-type alert transmission message is provided to the alert DB 160 or to the alert viewer 150 which is a high-level module.

The alert viewer 150 outputs the IDMEF-XML-type alert message which is parsed and translated in the IDMEF-XML message parsing and translation module 140, to confirm it. The alert DB 160 stores thereat the IDMEF-XML-type alert transmission message provided from the IDMEF-XML message parsing and translation module 140.

Meanwhile, the IDRS 200 includes the COPS-TDR client 210, an intrusion response module 230, an intrusion detection module 250 and an IDMEF-XML message building module 270.

The COPS-IDR client 210 receives the security policy information from the COPS-IDR server 130 in the CPS 100 through the COPS-IDR protocol S3 and then provides the security policy information to the intrusion response module 230 and the intrusion detection module 250.

The COPS-IDR client 210 encapsulates the IDMEF-XML alert message provided by the IDMEF-XML message building module 270 into an alert object to form the IDMEF-XML-type alert transmission message, and provides the IDMEF-XML-type alert transmission message to the COPS-IDR server 130 in the CPS 100 through the COPS-IDR protocol S3.

Figure 3:
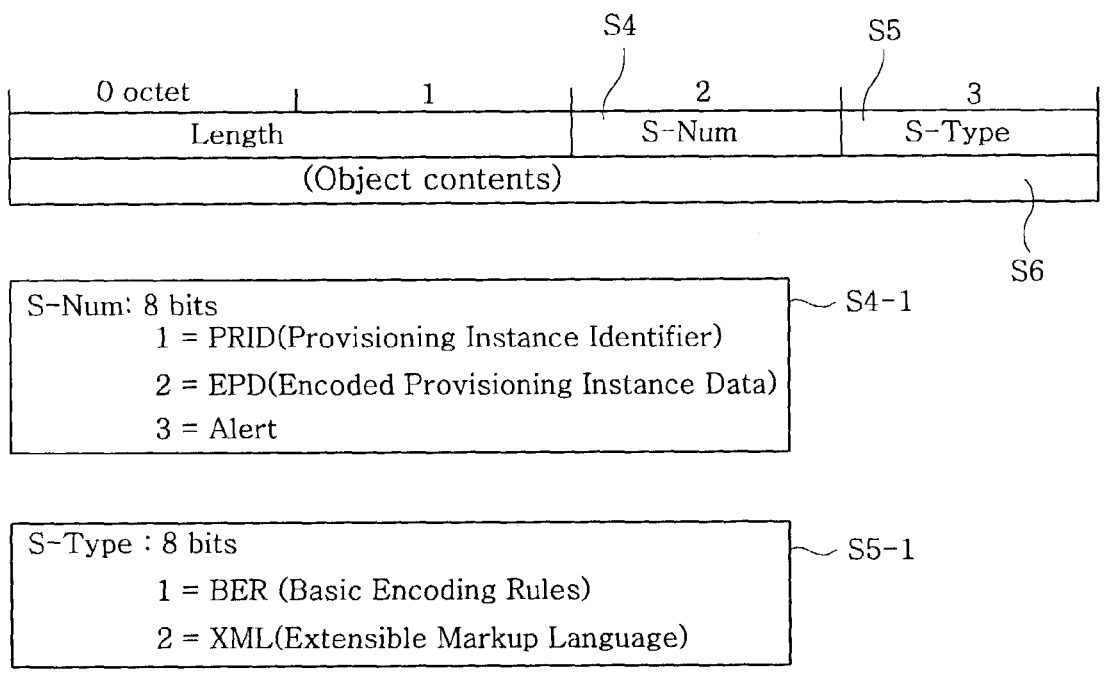
FIG. 3 depicts a format of an object of a COPS-IDR protocol in accordance with the present invention.

A format of objects of the COPS-IDR protocol S3 is described as follows. As illustrated in FIG. 3, each of the objects is distinguished based on a value of a S-Num field S4. In case the S-Num is embodied by 8 bits (S4-1), a field value "1" and "2" respectively indicate a provisioning instance identifier (PRID) object and an encoded provision instance data (EPD) object, which are used for transmitting the security policy information. Moreover, a field value "3" represents the alert object for transmitting the alert transmission message.

Further, an encoding method is distinguished based on a value of a S-Type field S5. In case the S-Type is embodied by 8 bits (S5-1), a field value "1" and "2" respectively indicate a basic encoding rules (BER) encoding and an extensible markup language (XML) encoding. An object contents field S6 has a variable length and carries the alert transmission message thereon.

Figure 4:
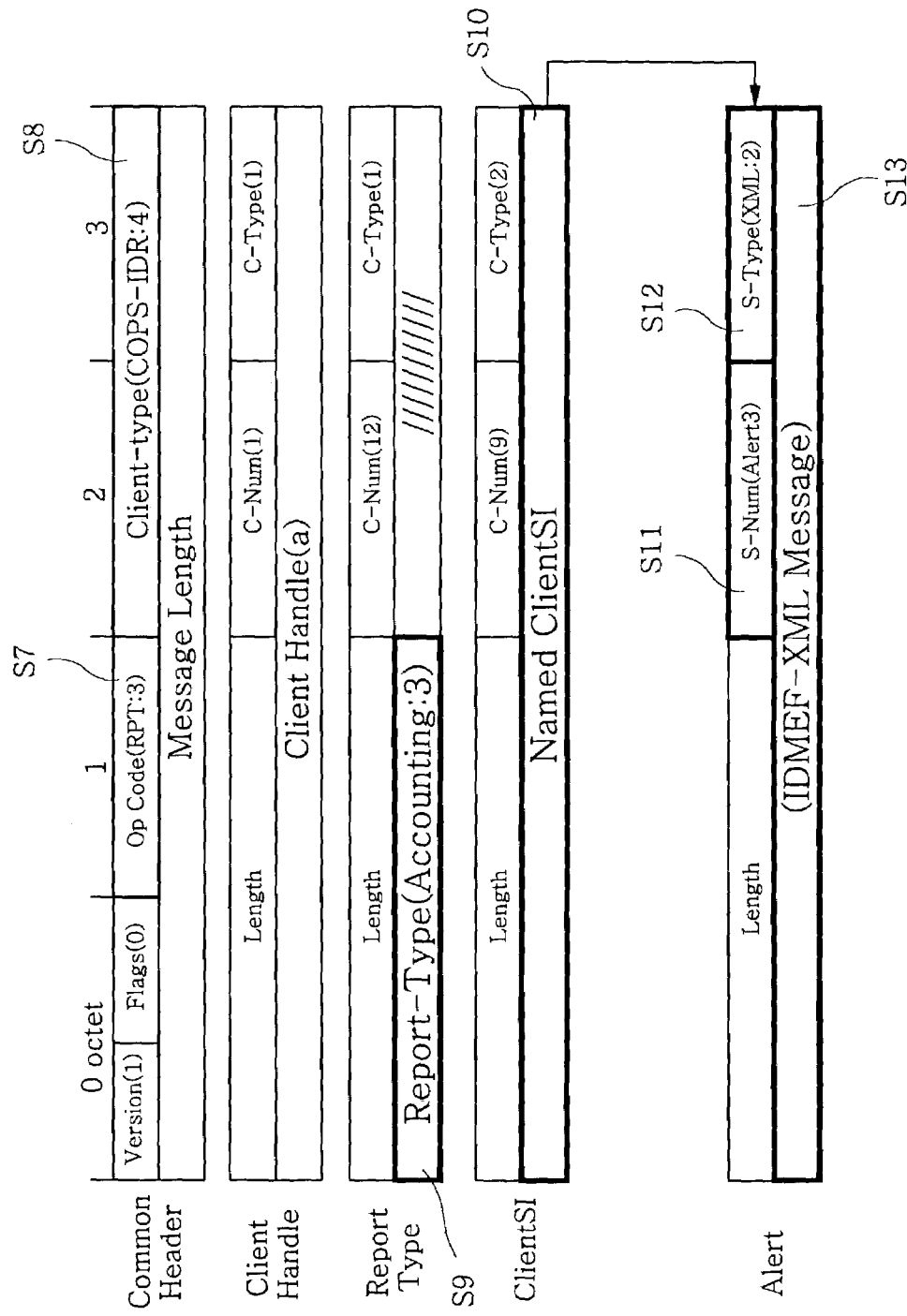
FIG. 4 presents a format of an alert transmission message in accordance with the present invention.

Referring to FIG. 4, there is illustrated a format of the IDMEF-XML-type alert transmission message. In this case, the objects of the COPS-IDR protocol S3 are used. Further, the alert object containing the alert message is encapsulated into a Named Client SI object to form the IDMEF-XML-type alert transmission message.

To be specific, a value of an Op Code field S7 in a Common Header object is "3", a value of a Client-Type field S8 in the Common Header object is "4" and a value of a Report-Type field S9 in a Report-Type object is "3", respectively indicating the alert transmission message, the COPS-IDR and an Accounting. The Named Client SI object S10, the alert object being encapsulated thereinto, is used for conveying the alert message. A value of a S-Num field S11 in the alert object is "3" and a value of a S-Type field S12 is "2", respectively indicating an alert and an XML. An object contents field S13 is filled with the IDMEF-XML alert message.

If an intrusion occurs by a hacker while the security policy information provided from the COPS-IDR client 210 is being executed, the intrusion detection module 250 detects the intrusion and generates a raw alert transmission message. Then, the generated raw alert transmission message is provided to the IDMEF-XML message building module 270 and the intrusion response module 230. When the raw alert transmission message is conveyed from the intrusion detection module 250 to the intrusion response module 230, the intrusion response module 230 responses to the intrusion.

The IDMEF-XML message building module 270 generates the IDMEF-XML-type alert message by formatting the raw alert transmission message and provides the IDMEF-XML-type alert message to the COPS-IDR client 210.

Figure 5A:
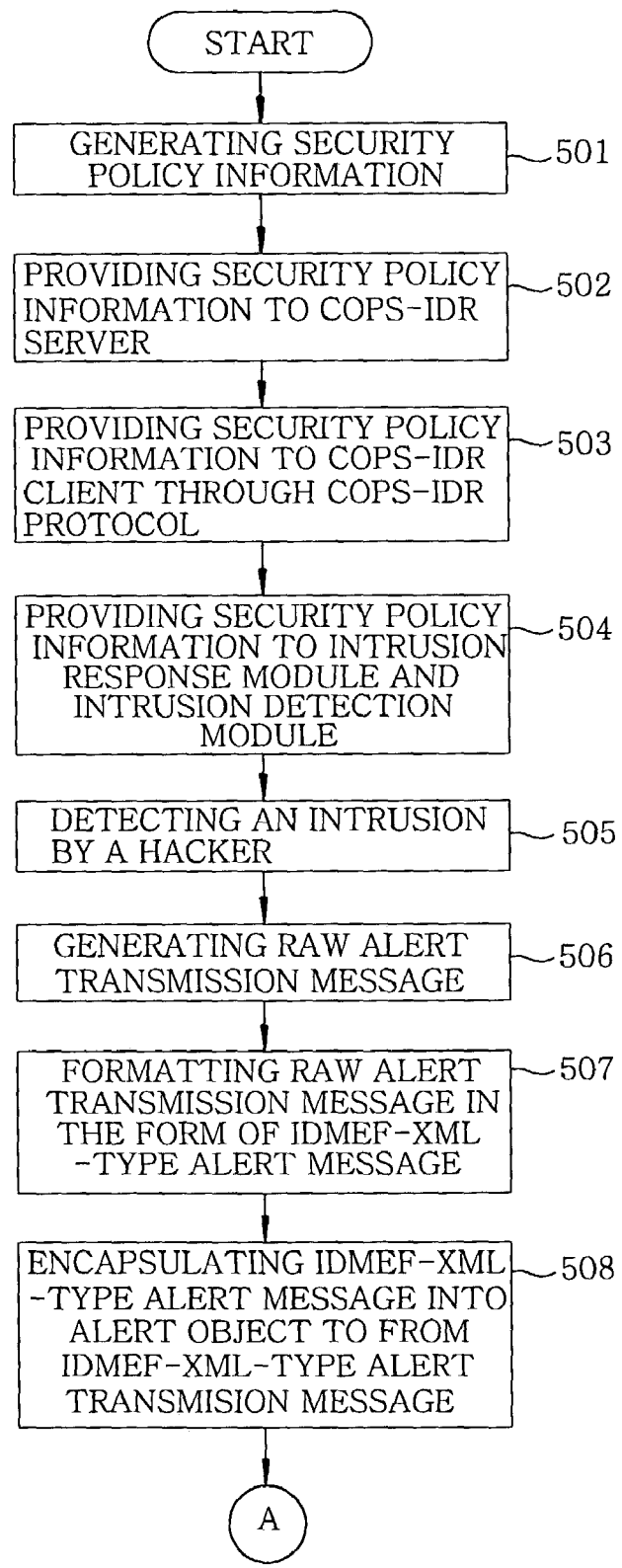
FIGS. 5A and 5B represent a detailed flowchart for describing a procedure of an alert transmission method for a policy-based intrusion detection and response in accordance with the present invention.
Figure 5B:
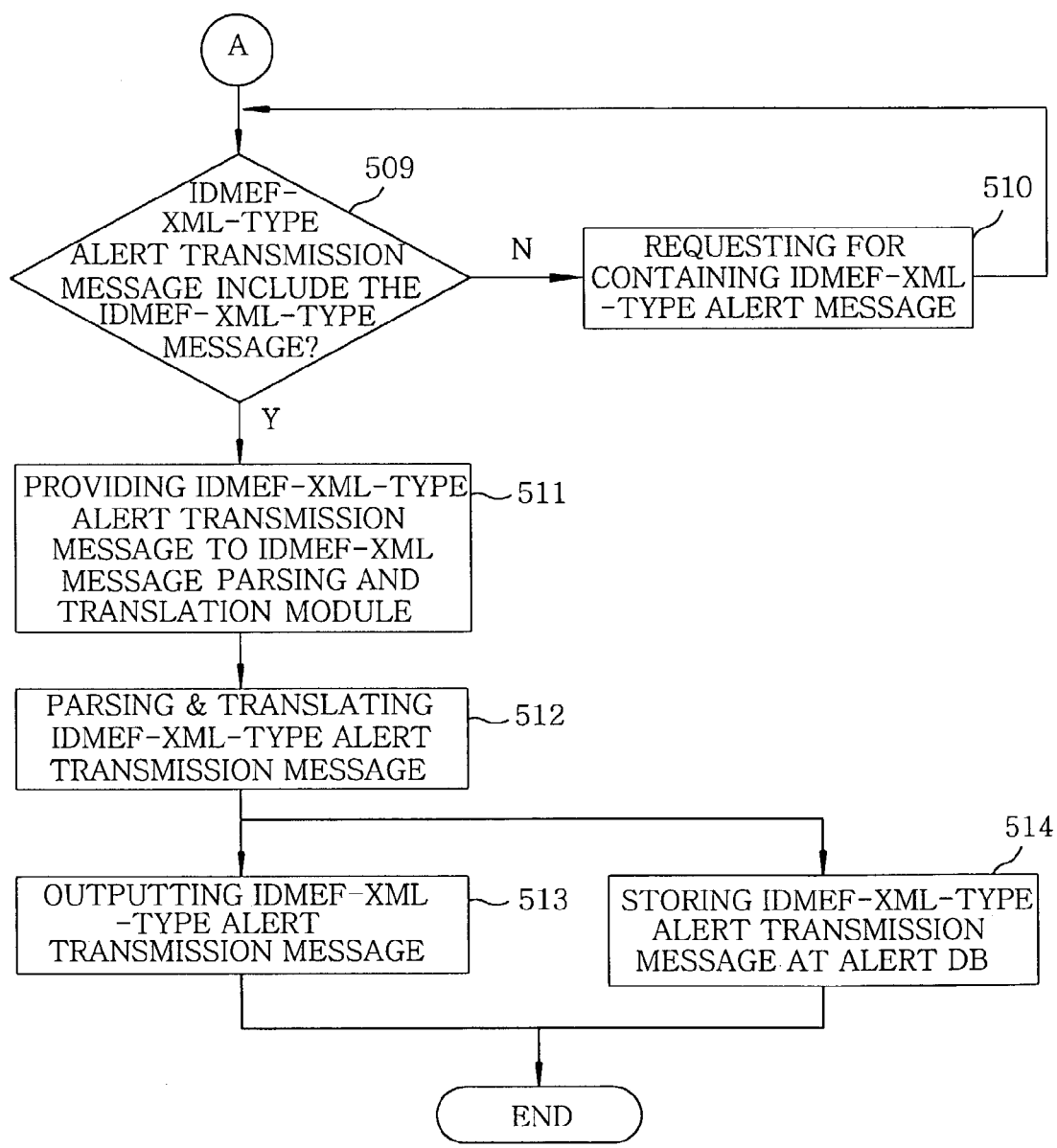

Referring to a flowchart of FIGS. 5A and 5B, a procedure of an alert transmission method for a policy-based intrusion detection and response in accordance with the present invention is described in detail.

The policy management tool 110 in the CPS 100 generates the security policy information and provides the generated security policy information to the policy repository 120 to store it thereat (step 501).

At the same time, the policy management tool 110 provides the generated security policy information to the COPS-IDR server 130 (step 502).

The COPS-IDR server 130 transmits the security policy information provided from the policy management tool 110 to the COPS-IDR client 210 in the IDRS 200 through the COPS-IDR protocol S3.

A format of objects of the COPS-IDR protocol S3 is described as follows. As illustrated in FIG. 3, each of the objects is distinguished based on a value of a S-Num field S4. In case the S-Num is embodied by 8 bits (S4-1), a field value "1" and "2" respectively indicate a provisioning instance identifier (PRID) object and an encoded provision instance data (EPD) object, which are used for transmitting the security policy information. Moreover, a field value "3" represents the alert object for transmitting the alert transmission message.

Further, an encoding method is distinguished based on a value of a S-Type field S5. In case the S-Type is embodied by 8 bits (S5-1), a field value "1" and "2" respectively indicates a basic encoding rules (BER) encoding and an extensible markup language (XML) encoding. An object contents field S6 has a variable length and carries the alert transmission message thereon.

The COPS-IDR client 210 in the IDRS 200 receives the security policy information from the COPS-IDR server 130 in the CPS 100 through the COPS-IDR protocol S3 and then provides the security policy information to the intrusion response module 230 and the intrusion detection module 250 (step 504).

If the intrusion occurs by a hacker while the security policy information provided from the COPS client 210 is being executed, the intrusion detection module 250 detects the intrusion (step 505) and generates the raw alert transmission message. Then, the generated raw alert transmission message is provided to the IDMEF-XML message building module 270 (step 506).

The IDMEF-XML message building module 270 generates the IDMEF-XML-type alert message by formatting the raw alert transmission message and provides the IDMEF-XML-type alert message to the COPS-IDR client 210 (step 507).

The IDMEF-XML-type alert message provided from the IDMEF-XML message-building module 270 is encapsulated into the alert object to form the IDMEF-XML-type alert transmission message. The COPS-IDR client 210 provides the IDMEF-XML alert transmission message to the COPS-IDP server 130 in the CPS 100 through the COPS-IDR protocol S3 (step 508).

A format of the IDMEF-XML-type alert transmission message is described as follows. In this case, the objects of the COPS-IDR protocol S3 are used. Further, the alert object containing the alert message is encapsulated into a Named Client SI object to form the IDMEF-XML-type alert transmission message.

To be specific, a value of an Op Code field S7 in a Common Header object is "3", a value of a Client-Type field S8 is the Common Header object is "4" and a value of a Report-Type field S9 in a Report-Type object is "3", respectively indicating the alert transmission message, the COPS-IDR and an Accounting. The Named Client SI object S10, the alert object being encapsulated thereinto, is used for conveying the alert message. A value of a S-Num field S11 in the alert object is "3" and a value of a S-Type field S12 is "2", respectively indicating an alert and an XML. An object contents field S13 is filled with the IDMEF-XML alert message.

Next, the COPS-IDR server 130 checks whether the IDMEF-XML-type alert transmission message provided from the COPS-IDR client 210 in the IDRS 200 through the COPS-IDR protocol S3 contains the IDMEF-XML-type alert message (step 509).

If the IDMEF-XML-type alert message is not contained therein, it is requested that the COPS-IDR client 210 should provide the IDMEF-XML-type alert transmission message with the IDMEF-XML-type alert message being contained therein (step 510).

On the other hand, if the IDMEF-XML-type alert message is included therein, the IDMEF-XML-type alert transmission message is provided to the IDMEF-XML message parsing and translation module 140 (step 511).

The IDMEF-XML message parsing and translation module 140 parses and translates the IDMEF-XML-type alert transmission message. Then, the IDMEF-XML-type alert transmission message is provided to the alert DB 160 or to the alert viewer 150 which is a high-level module (step 512).

The alert viewer 150 outputs the IDMEF-XML-type alert message which is parsed and translated in the IDMEF-XML message parsing and translation module 140, to confirm it (step 513). The alert DB 160 stores thereat the IDMEF-XML-type alert transmission message provided from the IDMEF-XML message parsing and translation module 140 (step 514).

The present invention performs the alert transmission for an intrusion response by using a new client type protocol, i.e., the COPS-IDR, and the objects of the COPS-IDR protocol. As a result, a system structure can be simplified. Further, a plurality of intrusion detection and response systems (IDRS) can be easily managed in a central policy server (CPS).

While the invention has been shown and described with respect to the preferred embodiments, it will be understood by those skilled in the art that various changes and modifications may be made without departing from the spirit and scope of the invention as defined in the following claims.

What is claimed is:

1. An alert transmission apparatus for a policy-based intrusion detection and response, comprising a central policy server (CPS) and an intrusion detection and response system (IDRS), wherein the CPS includes:

a policy management tool for generating security policy information and storing the generated security policy information in a policy repository;

a COPS-IDR server for sending the security policy information provided from the policy management tool to the IDRS through a COPS-IDR protocol and providing an IDMEF-XML-type alert transmission message having an IDMEF-XML-type alert message provided from the IDRS to a high-level module; and an IDMEF-XML message parsing and translation module for parsing and translating the IDMEF-XML-type alert transmission message provided from the COPS-IDR server, and then storing the IDMEF-XML-type alert transmission message parsed and translated at an alert DB or providing the IDMEF-XML-type alert transmission message parsed and translated to an alert viewer corresponding to the high-level module, and wherein the IDRS includes:

a COPS-IDR client for receiving the security policy information from the COPS-IDR server through the COPS-IDR protocol and providing the IDMEF-XML-type alert transmission message to the CPS through the COPS-IDR protocol, with the IDMEF-XML-type alert message being encapsulated into an alert object to generate the IDMEF-XML-type alert transmission message;

an intrusion detection module for detecting an intrusion in case a hacker intrudes while the security policy information provided from the COPS-IDR client is being executed and generating a raw alert transmission message;

an intrusion response module for responding to the intrusion in case the raw alert transmission message is transmitted thereto from the intrusion response module; and an IDMEF-XML message building module for generating the IDMEF-XML-type alert message by formatting the raw alert transmission message and providing the generated IDMEF-XML-type alert message to the COPS-IDR client;

wherein an object of the COPS-IDR protocol includes a S-Num field for identifying the object, a S-Type field for distinguishing encoding methods and an object contents field having a variable length.

2. The apparatus of claim 1, wherein, in case the S-Num is embodied by 8 bits, the S-Num field has a value among "1", "2" and "3", indicating a provisioning instance identifier (PRID) object, an encoded provision instance data (EPD) object and the alert object, respectively.

3. The apparatus of claim 2, wherein the values of the S-Num field "1" and "2" represent objects for conveying the security policy information and the value of the S-Num field "3" indicates an object for transmitting the IDMEF-XML-type alert transmission message.

4. The apparatus of claim 1, wherein, in case the S-Type is embodied by 8 bits, the S-Type field has a value among "1" and "2", representing a basic encoding rules (BER) encoding and an extensible markup language (XML) encoding, respectively.

5. The apparatus of claim 1, wherein the object contents field conveys the IDMEF-XML-type alert transmission message by including it therein.

6. The apparatus of claim 1, wherein, in a format of the IDMEF-XML-type alert transmission message, a value of an Op Code field in a Common Header object is "3", a value of a Client-Type field in the Common Header object is "4", and a value of a Report-Type field in a Report-Type object is "3", the values respectively indicating the alert transmission message, the COPS-IDR and an Accounting; the Named Client SI object, the alert object being encapsulated thereinto, is used for conveying the alert message; a value of a S-Num field in the alert object is "3" and a value of a S-Type field is "2", the values respectively indicating an alert and an XML; an object contents field is filled with the IDMEF-XML alert message.

7. An alert transmission method for providing policy-based intrusion detection and response within a system having a central policy server (CPS) and an intrusion detection and response system (IDRS), comprising the steps of:

(a) generating security policy information in a policy management tool in the CPS, and then storing the generated security policy information at a policy repository and providing the generated security information to a COPS-IDR server in the CPS at the same time;

(b) providing the security policy information, which is supplied from the COPS-IDR server, to a COPS-IDR client in the IDRS through a COPS-IDR protocol;

(c) providing the security policy information provided from the COPS-IDR client through the COPS-IDR protocol to an intrusion response module and an intrusion detection module in the IDRS;

(d) detecting an intrusion by the intrusion detection module, in case the intrusion occurs by a hacker while the security policy information is being executed, and then generating a raw alert transmission message at the intrusion detection module and providing the generated raw alert transmission message to an IDMEF-XML message building module in the IDRS;

(e) generating an IDMEF-XML-type alert message at the IDMEF-XML message building module by formatting the raw alert transmission message and then providing the IDMEF-XML-type alert message to the COPS-IDR client;

(f) generating an IDMEF-XML-type alert transmission message by encapsulating the IDMEF-XML-type alert message into an alert object at the COPS-IDR client and then providing the generated IDMEF-XML-type alert transmission message to the COPS-IDR server through the COPS-IDR protocol;

(g) checking whether or not the IDMEF-XML-type alert transmission message transmitted to the COPS-IDR server includes the IDMEF-XML-type alert message and then providing the IDMEF-XML-type alert transmission message, in case the IDMEF-XML-type alert message is included in the IDMEF-XML-type alert transmission message, to an IDMEF-XML message parsing and translation module in the CPS; and (h) parsing and translating the IDMEF-XML-type alert transmission message and then storing the IDMEF-XML-type alert transmission message at an alert DB in the CPS or providing the IDMEF-XML-type alert transmission message to an alert viewer corresponding to a high-level module to thereby output the IDMEF-XML-type alert transmission message;

wherein the COPS-IDR protocol at the steps (b) and (f) has a format including:

a S-Num field for distinguishing objects, in case the S-Num is embodied by 8 bits, values thereof "1", "2" and "3" indicating a provisioning instance identifier (PRID) object, an encoded provision instance data (EPD) object and the alert object, respectively;

a S-Type field for distinguishing encoding methods, in case the S-Type is embodied by 8 bits, values thereof "1" and "2" representing a basic encoding rules (BER) encoding and an extensible markup language (XML) encoding, respectively; and an object contents field for conveying the IDMEF-XML-type alert transmission message by including it therein.

8. The method of claim 7, wherein the values of the S-Num field "1" and "2" are used for conveying the security policy information and the value of the S-Num field "3" is used for transmitting the IDMEF-XML-type alert transmission message.

9. The method of claim 7, further comprising a step, in case the IDMEF-XML-type alert message is not included in the IDMEF-XML-type alert transmission message at the step (g), of making a request, to the COPS-IDR client, for providing the IDMEF-XML-type alert transmission message, with the IDMEF-XML-type alert message being included therein.

10. The method of claim 7, wherein, in a format of the IDMEF-XML-type alert transmission message, a value of an Op Code field in a Common Header object is "3", a value of a Client-Type field in the Common Header object is "4", and a value of a Report-Type field in a Report-Type object is "3", the values respectively indicating the alert transmission message, the COPS-IDR and an Accounting; the Named Client SI object, the alert object being encapsulated thereinto, is used for conveying the alert message; a value of a S-Num field in the alert object is "3" and a value of a S-Type field is "2", the values respectively indicating an alert and an XML; an object contents field is filled with the IDMEF-XML alert message.

* * * * *